United States Patent Office 3,130,483
Patented Apr. 28, 1964

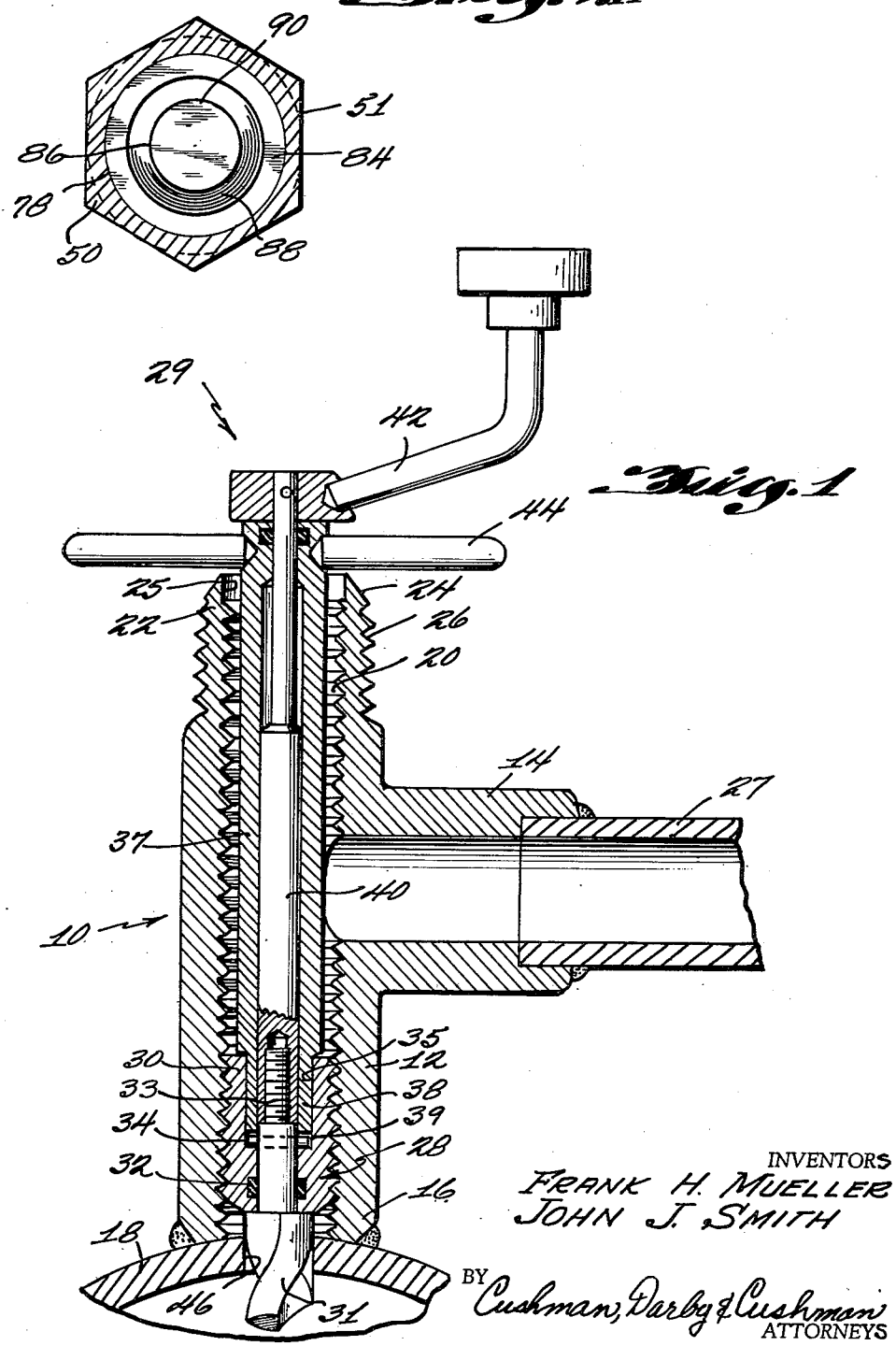

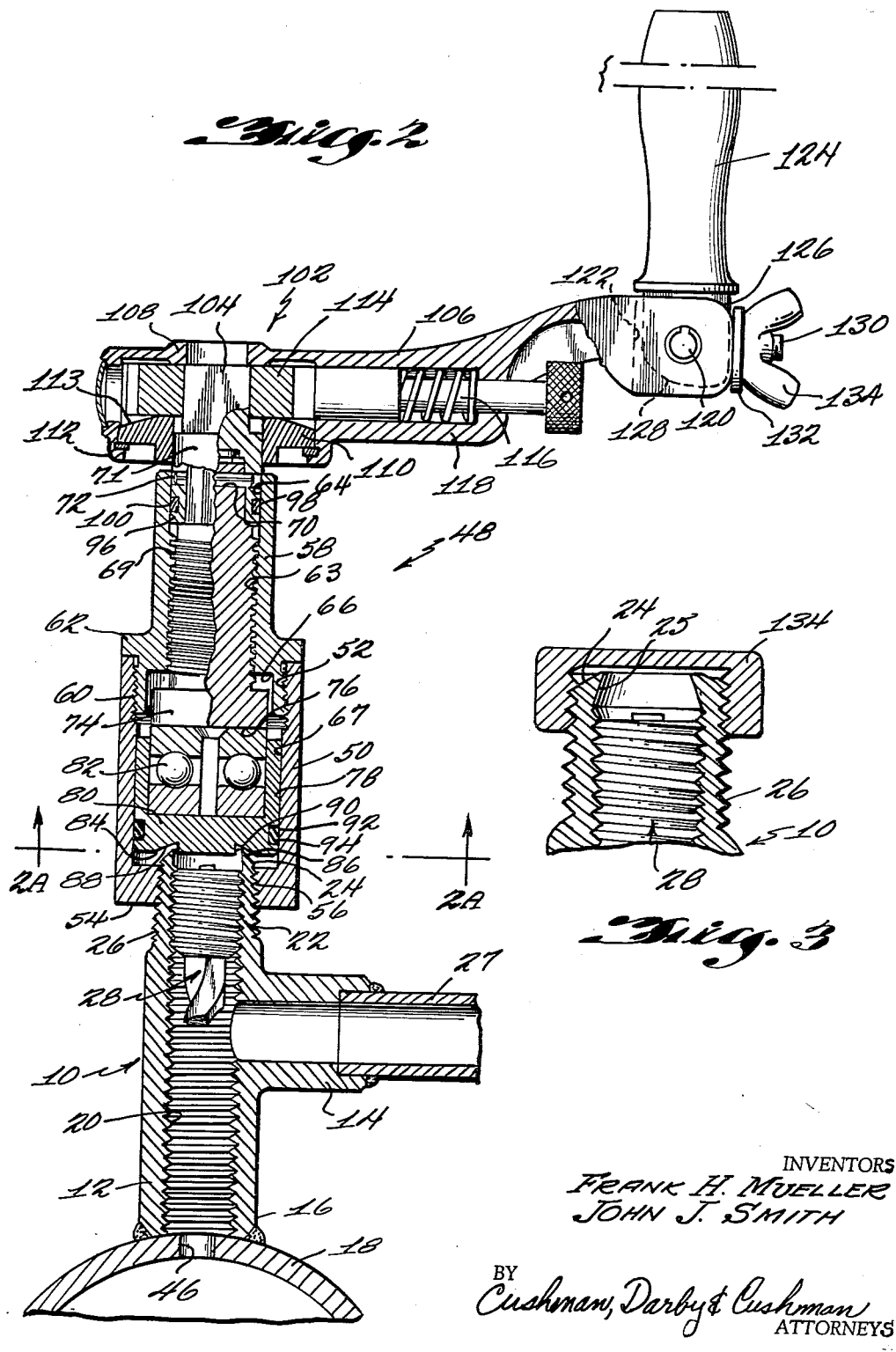

3,130,483
SERVICE T AND METHOD AND APPARATUS FOR CLOSING SAME WHEN IN SERVICE
Frank H. Mueller and John J. Smith, Decatur, Ill., assignors to Mueller Co., Decatur, Ill., a corporation of Illinois
Filed Apr. 27, 1962, Ser. No. 190,681
13 Claims. (Cl. 29—157)

This invention relates to connecting a service T to a pressurized gas main or the like, and has particular reference to a new and improved method and apparatus for permanently sealing the through bore of a service T after a hole has been formed in the pressurized main.

In the copending application of Mueller, Serial No. 845,550, filed October 9, 1959, now Patent 3,068,724 there is disclosed an arrangement for tapping pressurized service mains. As here disclosed, one end of the through bore of the service T is welded to a pressurized main. The through bore of the service T is interiorly threaded throughout its length and is adapted to threadably receive a combination pipe tap and seal. A tool is removably inserted into the end of the pipe tap opposite the pressure main, and is operative to rotate the pipe tap toward the main, and drill a hole therein. The pressure fluid is prevented from escaping from the main to the surrounding atmosphere by virtue of some closure means such as a valve, which seals off a service line connected to the branch of the T, while the pipe tap itself acts as a seal to prevent the pressure fluid from escaping through the opposite end of the through bore. In this copending application, the T-end opposite the pressure main is constructed and arranged to receive an O-ring and a retaining ring, this end also being exteriorly threaded to receive a closure cap. After the hole has been formed in the pressure main, the tap is retracted within the through bore to a position sufficient to allow the escaping fluid to flow into the service line, but is nevertheless retained within the T and acts as a seal, as mentioned. A closure cap is then threaded over the T end to close the same, a notably superior and rapid arrangement for tapping a pressure main thereby being provided.

While this prior art arrangement has enjoyed a considerable degree of success, the provision of a specially constructed service T having a recess at its interior end for receiving the O-ring and the retaining ring suffers certain shortcomings. In this regard, there is no means for preventing unskilled laborers or the like from tampering with the tap seal. The pipe tap is simply retained within the through bore of the service T, and could be inadvertently or mischieviously removed simply by removing the cap and retaining ring and unscrewing the pipe tap. A dangerous escape of pressurized fluid ensues with its obviously hazardous effects. Also, assembly of the retaining ring and O-ring in this operation is an undesirable task to accomplish in the field.

This invention contemplates an improvement in the teaching of the above-described copending application, there being provided by this invention a new and improved arrangement for positively retaining the tap within the bore so that the same cannot be removed after the connection is formed, the provision of a retaining ring and O-ring at the T end opposite the main being eliminated.

According to this invention there is provided a metal service T, interiorly threaded throughout its through bore and having an exteriorly tapered portion at the end opposite the pressure main, the T also being exteriorly threaded immediately below this tapered portion to receive a closure cap. A crimping tool is provided for removable connection to these exterior threads which is operative to bend this tapered bore-end portion of the service T radially inwardly, thereby positively securing the combination pipe tap and seal within the bore after pressure is supplied to the service line via the branch of this T.

Still another object of this invention is to provide a new and improved crimping tool constructed and arranged to be removably joined to one end of a pipe or pipe fitting, such as a service T, having an inwardly tapered frustro-conical end portion. The crimping tool includes a cylindrical body having at its lower end a longitudinally movable, tapered annular recess. In this regard, the annular recess has a tapered wall which is inclined to the longitudinal axis of the pipe or pipe fitting, a substantially greater angle than the angle of taper of the pipe or pipe fitting end portion. The tapered recess is operative to bend this tapered end of the pipe radially inwardly beyond its elastic limit, so that subsequent withdrawal of the pipe tap and seal is thereby prevented.

In the preferred embodiment of this invention the crimping tool includes a cylindrical lower body adapted to be threadably received on the exterior threads at the upper bore end of the service T. An upper body is joined to this lower body, the upper body being of cylindrical configuration and interiorly threaded along a major portion of its length for receiving a cooperatively threaded drive shaft. The lower body, being of cylindrical configuration, defines a chamber within which is slidably carried a punch, the lower surface of this punch carrying the annular recess as described for engagement with the tapered end of the service T. This punch is likewise of cylindrical configuration, receiving a thrust bearing which is operative to transmit the rotating motion of the drive shaft into a longitudinal movement of the punch to thereby force the pipe end radially inward, permanently bending the same, as described.

Still further according to this invention there is provided a new and improved method for providing a service connection to a pressurized gas main. In this regard, the service T is welded to the pressurized main, as described, and a pipe tap and seal, carried within the bore, is rotated toward the pressurized main to tap a hole therein. The pipe tap is then retracted a sufficient distance to allow the escaping fluid to flow into the service line via the lateral outlet of the service T. With the tap still carried in the bore, the service T, having an exteriorly tapered portion at this end of the through bore, is bent inwardly to thereby positively retain the pipe tap within the bore. Advantageously, a pipe closure cap is then threaded over this inwardly bent end of the service T.

By virtue of this invention, the pipe tap and seal is advantageously inserted into the through bore of the service T after the latter has been welded to the main. This prevents any possibility of damage to the pipe tap and seal by the welding heat. Additionally, the service line may be pressure tested from the end of the bore opposite the main prior to tapping a hole into the main.

These and still further objects, advantages and novel features of the present invention will become apparent in the specification and claims, taken in connection with the accompanying drawings.

In the drawings:

FIGURE 1 is a longitudinal elevation sectional view of the service T connection as a hole is tapped into the pressurized main;

FIGURE 2 is a view similar to FIGURE 1, showing the crimping tool according to this invention connected to the service T;

FIGURE 2a is a sectional view taken substantially along line 2A—2A in FIGURE 2; and FIGURE 3 is a longitudinal sectional view of the service T with one bore end closed off according to the present invention.

Referring now to FIGURE 1, there is shown a metal service T 10 having a through bore or run 12 and a lateral outlet 14. The T 10 at its lower or inlet end 16 is welded in a conventional manner to a metallic pressurized main 18. The through bore 12 of the T 10 is provided with interior threads 20 substantially throughout its entire length. The end 22 of the service T 10 opposite the inlet end 16 is provided with an exterior frustro-conical tapered surface 24. The portion 25 of the bore 12 immediately adjacent this surface 24 is not threaded, however, and defines a smooth bore, and thereby provides a reduction in the thickness of the wall of the service T immediately adjacent this end 22. Exterior threads 26 are formed on the bore end 22 of the service T 10, for receiving a closure cap, and for other reasons to become apparent. A service line 27 is welded or otherwise joined to the lateral outlet 14 of the service T 10, the service line 27 being closed to the surrounding atmosphere at some downstream position by a valve or the like (not shown).

A pipe tap and seal 28 is carried within the bore 12 of the service T 10 and is operative to drill a hole in the main 18 with a removable tool 29, as will now be explained.

The tap 28 includes a cylindrical collar 30 which is exteriorly threaded along its length for reception by the interior threads 20 of the T 10. The collar 30 carries through an aperture in its closed lower end, a drill or the like 31 of usual construction facing the main 18, the opposite end of the drill 31 including a sealed and rotatable shank 32 having a threaded upper end 33. A transverse pin 34 is carried by the shank 32, resting on the bottom of the collar 30. The collar 30 has a hexagonal socket 35 surrounding the drill shank 32 in spaced apart relationship, and is open at its upper end for receiving the tool 29.

The tool 29 consists of a cylindrical body 37 hexagonally shaped at its lower end 38 for reception into the hexagonal socket 35 of the collar 30. In this regard, the bottom surface of the hexagonal-shaped lower end 38 of the cylindrical body 37 has radially extending recesses 39, 40 adapted for selective engagement with the pin 34 to positively rotate the drill 31. The cylindrical body 37 carries a concentric rotatable shaft 40 having an interiorly threaded passage at its lower end so that the same may be threaded onto the upper end 32 of the drill shank. Rotation of the shaft 40 by a handle 42 joined to its upper end fixes the shaft 40 to the shank 32, thereby binding the pin 34 within a recess 39 in the body 37. The collar 30 initially is rotated downwardly to its drilling position adjacent the main 18 by another handle 44 joined to the cylindrical body 37 at its upper end. After a hole 46 is drilled in the main 18 by the rotating drill 31, the tap 28 is then retracted by opposite rotation of the tool 29 to a position above the lateral outlet 14 a sufficient degree to allow the pressure fluid to escape into the closed service line 27. Conveniently, this pipe tap and seal 28 may be retracted so that its uppermost end is just below the end 22 of the service T 10. The tool 29 is then withdrawn from its engagement with the hexagonal socket 35 after the shaft 40 is unthreaded from the shank end 33.

The pressure fluid is prevented from escaping from the service T 10 via the end 22 of the through bore 12 due to the fact the pipe tap 28 acts as a seal. This drilling procedure, as well as the construction of the pipe tap 28 and the tool 29 is now known in the art as disclosed in the copending application of Mueller Serial No. 845,550. As will be appreciated, alternative constructions of the pipe tap 28 are operable in drilling the hole 46 consistent with the teaching of this invention.

According to one feature of the present invention, there is provided a crimping tool 48 (FIGURE 2) which is operative to deflect or bend the tapered portion 24 of the bore end 22 radially inwardly beyond its elastic element so as to prevent withdrawal of the pipe tap and seal 28 from the bore 12 after the hole 46 has been formed in the main 18. The crimping tool 48 includes a lower body 50 of hollow, cylindrical configuration but with a hexagonal exterior surface 51 for engagement by a wrench or the like, and is interiorly threaded at its upper, open end at 52. The opposite lower end of the lower body 50 has a bottom wall 54 with an interiorly threaded aperture 56 operative to be screwed onto the threads 26 of the service T 10. An upper body 58, also of generally cylindrical construction, is exteriorly threaded at its lower end 60 for engagement with the cooperative interior threads 52 of the lower body. An external flange 62 conveniently limits the movement of this upper body with respect to the lower body 50. The upper body 58 is interiorly threaded throughout a major portion of its length at 63 but has a smooth bore 64 adjacent its upper end. The lower body 50 defines with the bottom wall surface 66 of the upper body 58 a cylindrical chamber 67. A cooperatively threaded drive shaft 69 extends through the upper body 58 into this chamber 67, this drive shaft having a transversely drilled passage 70 at its upper hexagonal end and receives a drive collar 71, the latter being fixed to the shaft 69 by a transversely extending spring pin 72 and having a hexagonal lower socket for receiving the upper hexagonal end of the drive shaft 69. Integrally formed on the bottom end of the drive shaft 69 is a cylindrical projection 74 having a flat bottom surface 76. Concentrically nested within the cylindrical chamber 67 is a punch 78 of cylindrical configuration having a thick bottom wall 80 but open at its top. Carried within the interior of the punch 78 is a thrust bearing 82 of conventional construction. The bottom surface 84 of the punch 78 has an annular recess 86 aligned with the tapered portion 24 of the end of the service T 10. This annular recess is defined by an inclined or tapered circular wall 88 which is inclined to the longitudial axis of the service T 10 a substantially greater angle than the angle of the taper at 24. The innermost end of this wall 88 terminates with a cylindrical wall 90 which is spaced inwardly of the interior bore of the through bore 12 a distance sufficient to allow inward deflection of the tapered portions 24 upon movement of the punch 78 longitudinally toward the main 18, as will be presently explained. The punch 78 conveniently carries a peripheral recess 92 receiving an O-ring 94; and, the drive collar 71 has a portion 96 closely adjacent the smooth bore 64 of the upper body 58. This enlarged portion 96 also carries a peripheral recess 98 for receiving an O-ring 100. The drive shaft 69 is rotated by any suitable means, there being shown a ratchet drive assembly 102 connected to the top, squared end 104 of the drive collar 71.

The ratchet drive assembly 102 includes a transversely mounted member 106 having an enlarged, integral collar 108 overlaying the squared end 104 of the drive collar 71. The opposite bottom end of the member 106 carries a disc 110 surrounding the portion 96 of the drive shaft 69, and is held in place by a retaining ring 112.

Carried in the space 113 between the disc 110 and the collar 108 is a ratchet wheel 114, drivingly secured to the squared end 104 of the drive collar 71.

A spring-loaded ratchet pawl 116 is carried within a boss 118 on the bottom of the member 106, the pawl 116 engaging the ratchet wheel 114 in the usual fashion.

The member 106 carries a pin 120 at its outer free end, and has a vertical end wall 122 closely adjacent thereto, extending between the opposite sides which receive the pin 120. A handle 124, having spaced apart depending portions 126 at its lower end, is pivotally secured to the pin 120. The depending portions are suitably curved at 128 to facilitate movement of the handle 124 about the end of the member 106. The pivot pin 120 carries a bolt 130, which extends beyond the end of the member 106 and is pivotable with respect to the pin 120, as by a boss connection (not shown) intermediate the spaced apart depending portions 126.

The bolt 130 carries a washer 132 and a wing nut 134 so that the handle 124 may be conveniently moved to selected pivoted positions, thence secured by tightening the wing nut 134 against the surface of the member 106.

In operation, after the hole 46 has been tapped in the main 18 and the pipe tap 28 has been retracted within the through bore 12 of the service T 10 to a position sufficient to allow the pressurized fluid to escape through the lateral outlet 14, as described, the crimping tool 48 is threaded onto the exterior threads 26 adjacent the upper bore end 22 via the threaded aperture 56 in its lower body 50. The crimping tool 48 is thereby positioned with the annular recess 86 in alignment with the tapered surface 24 of the service T 10 which extends into the lower body 50. The handle 124 of the crimping tool 48 is then rotated, driving the drive shaft 69 downwardly via the drive collar 71 so that longitudinal force is transmitted to the punch 78 via its bottom projection 76. This causes the tapered recess wall 88 of the punch 78 to engage the tapered surface 24 of the service T 10, bending this end portion of the service T 10 radially inward until the extremities of the surface 24 engage the cylindrical wall 90 which constitutes the inner surface of the recess 86.

The handle 124 is then rotated in its opposite direction, so the bottom projection abuts the bottom wall 66 of the upper body 58, whereupon continued rotation serves to unthread the lower body 50 from the exterior threads 26 of the service T 10. A conventional closure cap 134 is then threaded onto the exterior threads 26 of the service T 10, and the operation is completed, as shown in FIGURE 3. As will be appreciated, by virtue of the service T 10 being formed of metal, the bore end 22 is thereby capable of assuming a permanently bent shape, and the pipe tap and seal 28 cannot be removed from the bore 12 of the service T 10.

It will thus be seen that there has been provided by this invention a device in which the various objects hereinbefore set forth, together with many practical advantages, are successfully achieved.

As various possible embodiments may be made of the mechanical features of the above invention, all without departing from the scope thereof, it is to be understood that all matter hereinbefore set forth or shown in the accompanying drawings is to be interpreted as illustrative and not in a limiting sense.

We claim:
1. Method of providing a service connection to a pressurized gas main or the like comprising the steps of:
   (1) welding a metal service T to the main with one end of the T through bore adjacent thereto, the T being interiorly threaded along said bore and exteriorly threaded adjacent the other end of said bore;
   (2) joining a service line to the lateral outlet of the service T and closing said service line from the surrounding area whereby escape of pressurized fluid is prevented;
   (3) inserting a cooperatively threaded tap into the other end of the bore and rotating said tap toward said main to tap a hole therein, the escaping pressurized fluid being confined by said tap and said blocked service line;
   (4) retracting said tap to a position within said through bore a distance sufficient to provide fluid flow through into the service line;
   (5) threading a crimping tool onto the exterior threads adjacent the other end of said bore of said T;
   (6) and bending the metal of said T radially inwardly beyond its elastic limit at said opposite bore end by use of said tool to thereby confine said tap within said through bore;
   (7) removing said crimping tool; and
   (8) threading a closure cap onto said other bore end of said T.

2. Method of providing a surface connection to a pressurized gas main or the like comprising the steps of:
   (1) welding a metal service T to the main with one end of the T through bore adjacent thereto, the T being exteriorly threaded along said bore and the exterior surface of said T adjacent the other end of said bore being of frusto-conical configuration;
   (2) joining a service line to the lateral outlet of the service T and closing said service line from the surrounding area whereby escape of pressurized fluid is prevented;
   (3) inserting a cooperatively threaded tap into the other end of said bore and rotating said tap toward said main to tap a hole therein, the escaping pressurized fluid being confined by said tap and said blocked service line;
   (4) retracting said tap to a position within said through bore a distance sufficient to provide fluid flow through into the service line;
   (5) and forcing against said frusto-conical exterior surface an annular rigid surface having a tapered wall inclined to the longitudinal axis of said T a substantially greater angle than said exterior frusto-conical surface to thereby bend the metal of said T at said other bore end thereof radially inwardly beyond its elastic limit to thereby confine said tap within said through bore.

3. Method defined in claim 2 wherein said service T is exteriorly threaded below said frustro-conical surface, and including the step of threading a crimping tool to said exterior threads, said crimping tool carrying said annular rigid surface.

4. Crimping tool comprising: a housing; means at the lower end of said housing for temporarily engaging the end of a pipe, pipe fitting or the like; a longitudinally movable punch carried within said housing; said punch having a rigid bottom surface facing said pipe, and a tapered wall in said bottom surface positioned to engage the pipe end; a drive shaft carried within said housing opposite said punch bottom surface and in operative alignment therewith; and means for rotating said drive shaft relative to said housing to force said punch longitudinally towards said pipe end whereby the tapered wall bends said pipe end radially inwardly a sufficient distance to partially block the bore of the pipe.

5. Crimping tool defined in claim 4 wherein said tapered wall is of continuous annular configuration.

6. Crimping tool defined in claim 5 including a cylindrical inner wall extending towards said bottom surface from the innermost end of said tapered wall.

7. Crimping tool defined in claim 4 including a thrust bearing interposed between said drive shaft and said punch.

8. Crimping tool defined in claim 4 including means for limiting the movement of said drive shaft away from said punch upon opposite rotation thereof.

9. Crimping tool defined in claim 4 including a transversely extending handle joined to said drive shaft to provide manual rotation thereof.

10. Crimping tool defined in claim 4 wherein said drive shaft has a non-circular upper end, and including a drive collar joined to said drive shaft upper end, and a ratchet drive handle joined to said drive collar.

11. Crimping tool defined in claim 4 wherein said housing includes a lower body having a bottom wall, said pipe engaging means constituting an interiorly threaded aperture through said bottom wall for engaging cooperative exterior threads on said pipe; said punch being of open-top cylindrical configuration; a thrust bearing carried within said punch; an upper body joined to the upper end of said lower body and having an interiorly threaded bore receiving said drive shaft in axial alignment with said thrust bearing; means carried by said shaft extending transversely below the lower end of said upper body for limiting retraction of said shaft, and handle means extending transversely of said shaft above said upper body for manually rotating the same.

12. In combination with the crimping tool defined in claim 4, a metal service T having a bore threaded along its length and a lateral outlet, the end of said bore adjacent said tool being exteriorly threaded; said engaging means constituting an interiorly threaded aperture operative for engagement with the bore end of said T; said T having a frustro-conical exterior surface above said exterior threads arranged for alignment with the tapered wall of said punch bottom surface, the angle of taper of said bore end with respect to the longitudinal axis being substantially less than the angle of taper of said punch wall, the bore end defined by said frustro-conical surface being of sufficient length to deflect inwardly beyond its elastic limit to partially close said bore.

13. The combination defined in claim 12 wherein said adjacent bore end has a smooth bore portion adjacent said frustro-conical surface, the length of said bore defined by said smooth bore portion being of a length sufficient to deflect radially inwardly beyond the inner extent of said threaded bore.

References Cited in the file of this patent

UNITED STATES PATENTS

| | | |
|---|---|---|
| 1,267,763 | Grikscheit | May 28, 1918 |
| 2,677,526 | Johnson | May 4, 1954 |
| 2,990,731 | Merrill et al. | July 4, 1961 |